(12) United States Patent
Cheng et al.

(10) Patent No.: US 8,099,768 B2
(45) Date of Patent: Jan. 17, 2012

(54) METHOD AND SYSTEM FOR MULTI-PROTOCOL SINGLE LOGOUT

(75) Inventors: Qingwen Cheng, Pleasanton, CA (US); Ping Luo, Pleasanton, CA (US); Andrew Patterson, San Jose, CA (US); Rajeev Angal, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 553 days.

(21) Appl. No.: 12/233,377

(22) Filed: Sep. 18, 2008

(65) Prior Publication Data

US 2010/0071056 A1 Mar. 18, 2010

(51) Int. Cl.
*H04L 29/00* (2006.01)
(52) U.S. Cl. .......................................... 726/8; 709/229
(58) Field of Classification Search .................. 709/229; 726/8
See application file for complete search history.

(56) References Cited

U.S. PATENT DOCUMENTS

| | | | |
|---|---|---|---|
| 2004/0128393 A1* | 7/2004 | Blakley et al. | 709/229 |
| 2004/0225878 A1* | 11/2004 | Costa-Requena et al. | 713/150 |
| 2006/0218628 A1* | 9/2006 | Hinton et al. | 726/8 |

* cited by examiner

*Primary Examiner* — Vivek Srivastava
*Assistant Examiner* — Anthony Brown
(74) *Attorney, Agent, or Firm* — Osha • Liang LLP

(57) ABSTRACT

A method for multi-protocol logout. The method includes receiving, by a first identity provider, a logout request from a user agent, wherein the first identity provider executes in a federation manager, and initiating a logout on a service provider associated with the first identity provider based on the logout request by the first identity provider. The method further includes identifying, by the federation manager, a plurality of identity providers associated with the user agent, wherein the plurality of identity providers communicate using heterogeneous federation protocols, and initiating, by the federation manager, a logout on each of the plurality of identity providers based on the logout request using the plurality of heterogeneous federation protocols. The method further includes initiating, by the plurality of identity providers, a logout of each service provider corresponding to the plurality of identity providers, identifying a status of each logout, and sending the status to the user agent.

20 Claims, 5 Drawing Sheets

METHOD AND SYSTEM FOR MULTI-PROTOCOL SINGLE LOGOUT

BACKGROUND

One of the benefits of a network is to allow users to access services from a remote computer system using a local computer system. For example, users may use online banking services to check their financial accounts, online gaming services to play games with other users, on-demand video services to watch movies, and access other such services. Often the services are provided by different service providers. The service providers may require that the users are authenticated before providing access to the resource.

In order to authenticate the user, the service provider may require that the user have a digital identity associated with the service provider. Thus, when multiple service providers are controlled by different business organizations, a user may have multiple digital identities, one for each service provider. Because of the multiple digital identities, a user may be required to sign-on to each service provider separately. In order to remove this requirement, identity federation may be used.

Identity federation allows business organizations controlling different service providers to form a partnership and share digital identities. The partnership allows the service providers to form a circle of trust. The circle of trust has a one or more identity providers that communicates with the service providers and manages the authentication of the user. Thus, when a user is authenticated to one service provider, the user may be automatically allowed access to other service providers in the same circle of trust.

SUMMARY

In general, in one aspect, the invention relates to a method for multi-protocol logout. The method includes receiving, by a first identity provider, a logout request from a user agent, wherein the first identity provider executes in a federation manager, and initiating a logout on a service provider associated with the first identity provider based on the logout request by the first identity provider. The method further includes identifying, by the federation manager, a plurality of identity providers associated with the user agent, wherein the plurality of identity providers communicate using heterogeneous federation protocols, and initiating, by the federation manager, a logout on each of the plurality of identity providers based on the logout request using the plurality of heterogeneous federation protocols. The method further includes initiating, by the plurality of identity providers, a logout of each service provider corresponding to the plurality of identity providers, identifying a status of each logout, and sending the status to the user agent.

In general, in one aspect, the invention relates to a federation manager for multi-protocol logout, including a processor, a multi-federation protocol manager, and a plurality of identity providers in a circle of trust. The federation manager is configured to receive a notification from a first identity provider of the plurality of identity providers that a user agent has requested to logout of a service provider associated with the first identity provider, wherein the first identity provider uses a first federation protocol, identify, in response to the notification, a second federation protocol used by the circle of trust, determine whether the user agent has an open session with a second identity provider of the plurality of identity providers in the circle of trust, wherein the second identity provider uses the second protocol, initiate a logout of the user agent on the second identity provider, initiate, in response to the logout, a logout of the user agent on a second service provider associated with the second identity provider, and send a status of the logout to the user agent.

In general, in one aspect, the invention relates to a computer readable medium including computer readable program code embodied therein for causing a computer system to receive, by a first identity provider, a logout request from a user agent, wherein the first identity provider executes in a federation manager, initiate a logout on a service provider associated with the first identity provider based on the logout request by the first identity provider, identify, by the federation manager, a plurality of identity providers associated with the user agent, wherein the plurality of identity providers communicate using heterogeneous federation protocols, initiate, by the federation manager, a logout on each of the plurality of identity providers based on the logout request using the plurality of heterogeneous federation protocols, initiate, by the plurality of identity providers, a logout of each service provider corresponding to the plurality of identity providers, identify a status of each logout, and send the status to the user agent.

Other aspects of the invention will be apparent from the following description and the appended claims.

DETAILED DESCRIPTION

Figure 1:
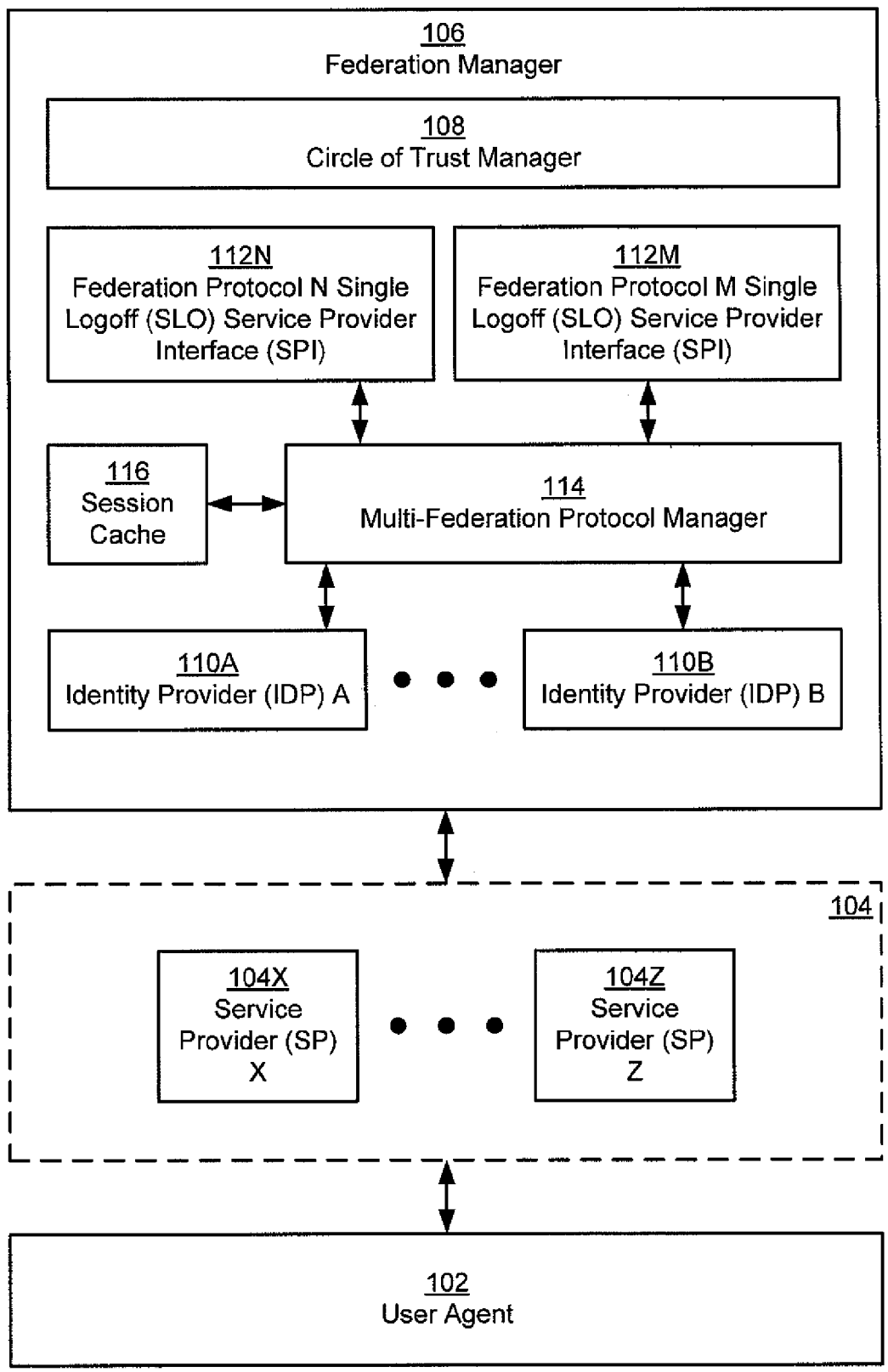
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for single logout across multiple service providers when the multiple service providers use heterogeneous federation protocols. A federation protocol is a communication protocol used between the service provider and the identity provider to authenticate a user. For example, federation protocols may include Security Assertion Markup Language (SAML) protocol, SAML version 2 (SAML v2) protocol, Web Services Federation (WS-Federation) protocol, Identity Federation Framework (ID-FF) protocol, and other protocols. Different service providers may be configured to communicate using different federation protocols. For example, legacy service providers may communicate with older and more obscure federation protocols while newer service providers may communicate with recently created federation protocols.

Embodiments of the invention allow for service providers using heterogeneous federation protocols to be in the same circle of trust. A circle of trust is a group of service providers and identity providers that may share authentication information. Specifically, when a user is authenticated to one service provider, the user is automatically authenticated to another service provider. Embodiments of the invention allow for a single logout of the user from all service providers when the service providers use heterogeneous federation protocols. Specifically, when the user is logged off of one service provider in the circle of trust, the user may automatically be logged off of all service providers in the circle of trust.

In one or more embodiments of the invention, determining whether a user is authenticated to a service provider and subsequently to the circle of trust is based on the existence or lack thereof of an open user session. A user session is a period of communication activity between a time in which the user is authenticated to a service provider and when a user is no longer authenticated to the service provider. The user session allows a user to communicate with the service provider without requiring the user or the service provider to re-authenticate the user. Service providers and a federation manager (discussed below) may track which user sessions are open.

FIG. 1 shows a schematic diagram in accordance with one or more embodiments of the invention. As shown in FIG. 1, the system includes a user agent (102), service providers (104), and a federation manager (106) in accordance with one or more embodiments of the invention. Each of these components is described below.

In one or more embodiments of the invention, the user agent (102) is a program that allows the user to access service providers (104). The user agent (102) includes functionality to request access to each service provider, assist in authenticating the user, and act as an interface between the user and the service provider. For example, the user agent (102) may be a web browser, an application that executes locally on the user's computer system, or another application that allows the user to access the service providers (104).

In one or more embodiments of the invention, the user agent includes functionality to contact service providers (104). A service provider (104) provides a service to the user. For example, the service provider may provide banking services, on-demand video services, ring tones for mobile telephones, gaming services, real-time alerts, and other services. The service provider (104) may provide the service via a network, such as a local area network, a wide area network (e.g., the Internet), a virtual private network, or any other type of network.

The service providers (104) may be administered by the same entity or by different entities. For example, service provider X (104X) may be developed by and executed on servers associated with the XYZ Corporation while service provider Y (104Y) is developed by and executed on servers associated with the ABC Corporation. Alternatively, each service provider (104) may be administered and controlled by the same entity that provides different the services.

In one or more embodiments of the invention, the service providers (104) communicate using heterogeneous federation protocols. For example, service provider X (104X) may be a legacy application in execution for multiple years. Thus, service provider X (104X) may be configured to communicate with an older federation protocol. In the example, service provider Z (104Z) may be a new application developed in the past year. Accordingly, service provider Z (104Z) may communicate using a newly developed federation protocol. Although service provider X (104X) and service provider Z (104Z) communicate using different federation protocols, service provider X (104X) and service provider Z (104Z) may be in the same circle of trust.

In one or more embodiments of the invention, the service provider is connected to a federation manager (106). The federation manager (106) includes functionality to create and manage a circle of trust. The federation manager (106) includes a circle of trust manager (108), identity providers (110), one or more protocol single logout (SLO) service provider interfaces (SPI) (e.g., 112N, 112M), a multi-federation protocol manager (114), and a session cache (116). Each of these components is discussed below.

A circle of trust manager (108) includes functionality to manage the circle of trust. Specifically, the circle of trust manager (108) includes functionality to create a new circle of trust and add and remove components to the circle of trust, such as the service providers (104) and the identity providers (110).

In one or more embodiments of the invention, each identity provider (110) is associated with a federation protocol. For example, identity provider A (110A) may communicate using SAML v2 authentication protocol while identity provider B (110B) communicates using ID-FF authentication protocol. The identity provider (110) includes functionality to service access requests for a group of service providers (104). The service providers in the group use the same federation protocol as the identity provider. The federation protocol is used to communicate access requests and responses between the identity provider (110) and the service providers (104) in the group. The access requests include requests to authenticate a user to the circle of trust, create a session for the user, and logout the user from the circle of trust.

In one or more embodiments of the invention, identity providers includes functionality to initiate a logout for a user from any identity provider or service provider in the circle of trust using different federation protocols. The logout may be originally initiated by the identity provider or the service provider. For example, when a service provider in the group sends an access request to logout a user to an identity provider, the identity provider includes functionality to initiate a logout of the user with the remaining service providers in the group. As another example, the identity provider may originally initiate a logout among the service providers. In the example, the user agent may access the identity provider using a federation protocol to perform the single logout. In response, the identity provider may initiate the logout among all service providers and other identity providers. The identity provider further includes functionality to generate an access request to logout the user from other service providers.

Each federation protocol used by the identity providers (110) and service providers (104) implements a protocol SLO SPI (112N, 112M). In one or more embodiments of the invention, the protocol SLO SPI (112N, 112M) defines the interface for sending a logout request using a particular federation protocol. In one or more embodiments of the invention, the protocol SLO SPI (112N, 112M) includes an interface for logging off a single specified user session, a specified set of user sessions, or all user sessions. The protocol SLO SPI (112N, 112M) may also identify the identity provider and/or service provider that initiates the single logout information, whether Simple Object Access protocol (SOAP) binding or Hypertext Transfer Protocol (HTTP) binding is used for the initiating the initial logout request, state information about the logout, the current status of the logout, and other such information. The protocol SLO SPI (112N, 112M) may also include mechanism for responding to the entity initiating the logout, such as succeeded, failed, a partial logout achieved, the logout is redirected, and other such responses.

Continuing with FIG. 1, in one or more embodiments of the invention, the identity providers (110) are connected to a multi-federation protocol manager (114). The multi-federation protocol manager (114) includes functionality to manage the logout of a user across multiple identity providers. Specifically, the multi-federation protocol manager (114) includes functionality to identify each identity provider (110) in the circle of trust. For each identity provider (110) in the circle of trust, the multi-federation protocol manager (114) includes functionality to determine whether the user has a session with the identity provider (110), and use the protocol SLO SPI (112N, 112M) to initiate a logout of the user on the identity provider (110).

In one or more embodiments of the invention, the multi-federation protocol manager is associated with a session cache (116). The session cache maintains a listing of user sessions. In one or more embodiments of the invention, the session cache (116) includes a table for each identity provider (110). The table identifies the sessions open between users and service providers corresponding to the identity provider. In one or more embodiments of the invention, for each service provider, the table maintains a list of users that have a session open with the service provider. Although the above is discussed with respect to a tabular approach to trace which sessions are open, other approaches and/or data structures may be used without departing from the scope of the invention.

Different methods may be used to create a circle of trust with service providers in accordance with one or more embodiments of the invention. In one or more embodiments of the invention, a new federation manager is created. The circle of trust manager in the federation manager may instantiate a new circle of trust. Further, identity providers are instantiated in the federation manager for each federation protocol and added to the circle of trust. In one or more embodiments of the invention, service providers are added to the circle of trust by obtaining metadata about the service providers, such as a description of the services provided by the service provider, the sign-on and logout protocols for the service provider, how to access the service provider, and other such information. The obtained metadata may be used by the federation manager to create a remote instance of the service provider in the federation manager and add the service provider to the circle of trust. The remote instance allows the identity provider to interface with the service provider. In one or more embodiments of the invention, after a service provider is added to the circle of trust, the service provider may use the circle of trust to authenticate users and to logout users.

Figure 2:
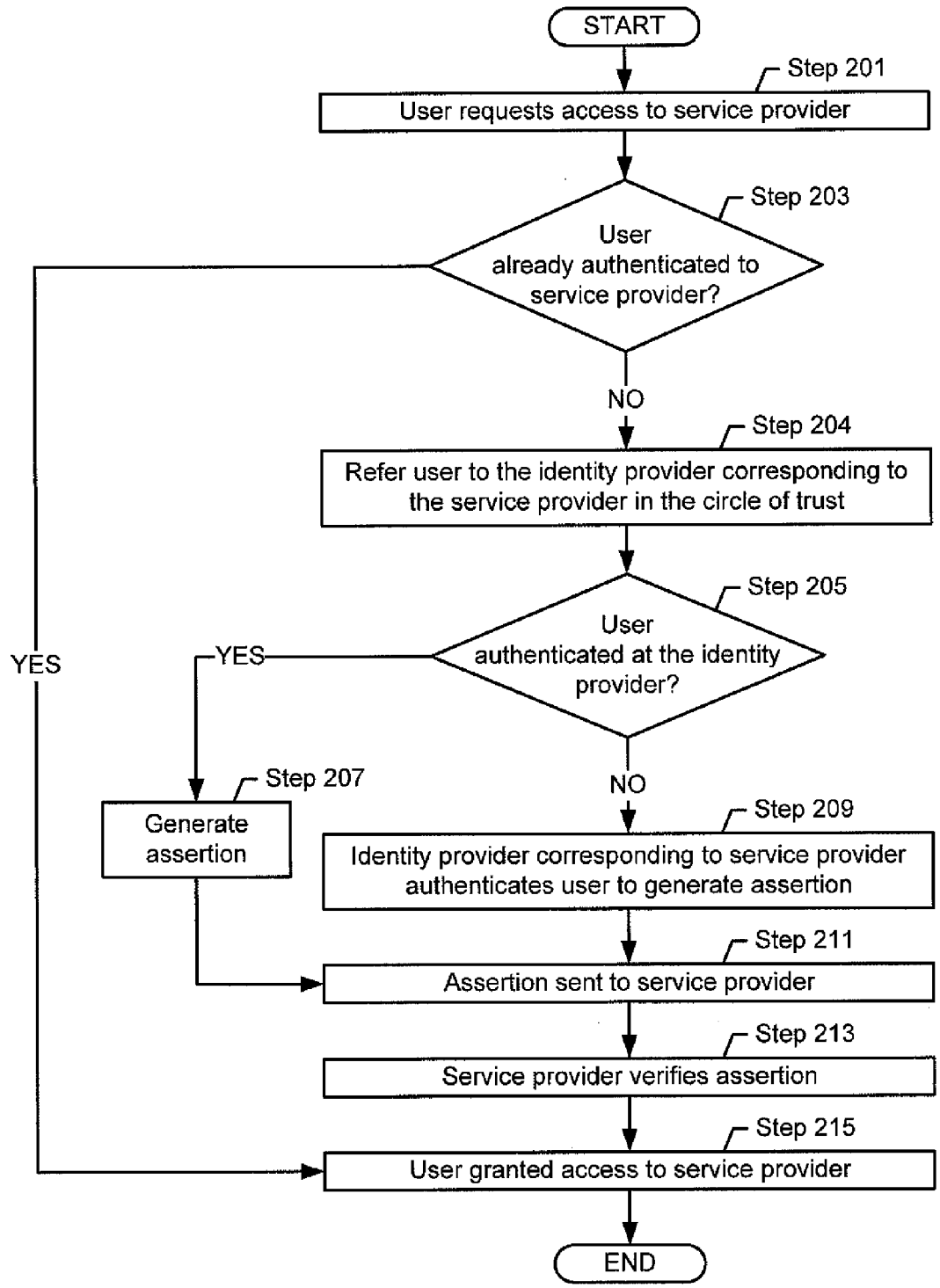
FIGS. 2 and 3 show flowcharts in accordance with one or more embodiments of the invention.
Figure 3:
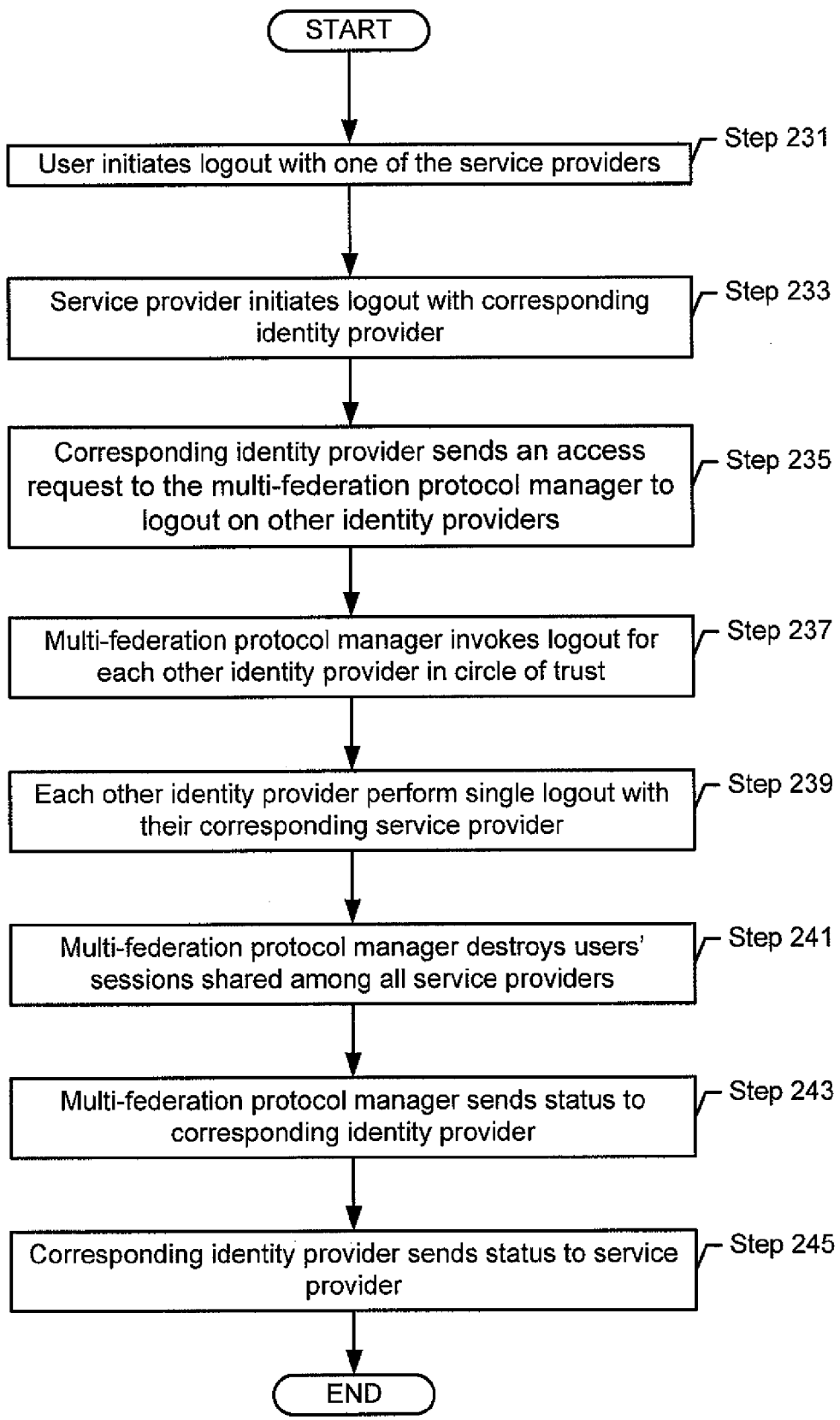

FIGS. 2 and 3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as receive and authenticated acknowledgements have been omitted to simplify the presentation.

FIG. 2 shows a flowchart for authenticating a user to a service provider in accordance with one or more embodiments of the invention. In step 201, a user requests access to the service provider. The user may request access to the service provider using, for example, a user agent. For example, the user may attempt to access a service provided by the service provider that requires authentication.

In step 203, a determination is made whether the user is already authenticated to the service provider. Specifically, the service provider may use local session information to determine whether the user is already authenticated. If the user is already authenticated to the service provider, then the service provider grants access to the user (Step 215).

Alternatively, if the user is not already granted access to the service provider, then the service provider may refer the user to the corresponding identity provider to authenticate the user (Step 204). Specifically, the service provider may send an access request to the identity provider corresponding to the service provider. The service provider may alternatively redirect the user agent of the user to the identity provider. In one or more embodiments of the invention, the access request is sent in the federation protocol used by the service provider.

In one or more embodiments of the invention, a determination is made whether the user agent is authenticated to the identity provider (Step 205). The identity provider may query the session cache to determine whether the user is authenticated to the circle of trust. Alternatively, the identity provider may send a query to the multi-federation protocol manager to determine whether the user is authenticated to the circle of trust. The multi-federation protocol manager may query the session cache to determine whether the user has any open sessions with service providers in the circle of trust.

As another alternative, the identity provider may first determine whether the user is authenticated to another service provider corresponding to the identity provider (e.g., another service provider that uses the same federation protocol as the identity provider). If the user is not authenticated to another service provider of the identity provider, then the identity provider may send an access request to the multi-federation protocol manager to determine whether the user is authenticated to a service provider associated with another identity provider. The multi-federation protocol manager may send a request to each identity provider using each corresponding federation protocol to determine whether the user has a session with another service provider.

If the user is already authenticated to the identity provider in the circle of trust, then an assertion is generated (Step 207). The assertion allows the service provider to verify that the identity provider authenticated the user. For example, the assertion may identify the user, identify the access request sent by the service provider, provide information to verify the identity provider, and include other information pertinent to authenticating the user.

If the user is not already authenticated to another service provider in the circle of trust, then the identity provider corresponding to the service provider authenticates the user to generate the assertion (Step 209). Specifically, the identity provider verifies the identity of the user. The identity provider may use any method known in the art to authenticate the user. Based on the authentication, the user agent generates an assertion.

In step 211, the assertion is sent to the service provider. In step 213, the service provider verifies the assertion. If the assertion is verified, the service provider grants access to the user. When granting access to the user, the service provider may create a session for the user and send the session information to the federation manager. The federation manager may store the session information, such as in the session cache or with the identity provider.

The user may continue to request access to different service providers in the circle of trust. Accordingly, the user may have multiple open sessions with service providers in the circle of trust. When the user is logged off of one service provider, the user may be logged off of all service providers in the circle of trust.

FIG. 3 shows a flowchart for performing single logout of a user in accordance with one or more embodiments of the invention. In one or more embodiments of the invention, the user agent initiates a logout with one of the service providers (step 231). The logout request may be based on the user sending a command to logout, the expiration of a time limit to access the service provider, etc.

In step 233, the service provider initiates a logout with the corresponding identity provider. The service provider sends the logout request using the federation protocol of the service provider. The identity provider that uses the federation protocol of the service provider receives the logout request. The identity provider determines whether any other service provider uses the same federation protocol. If another service provider uses the same federation protocol, then the identity provider may send to each service provider a logout request for the user using the federation protocol. Accordingly, each service provider that receives a logout request from the identity provider performs a logout of the user.

In step 235, the corresponding identity provider also sends an access request to the multi-federation protocol manager to logout other identity providers. For example, the corresponding identity provider may perform a method call on the multi-federation protocol manager to perform a single logout across all identity providers within the circle of trust.

In step 237, the multi-federation protocol manager invokes a logout for each other identity provider in the circle of trust. For example, the multi-federation protocol manager may use each protocol SLO SPI to invoke the single logout on each identity provider. In one or more embodiments of the invention, the multi-federation protocol manager may invoke the single logout sequentially or in parallel across the identity providers.

In one or more embodiments of the invention, rather than sending the logout request to each of the other identity providers, the multi-federation protocol manager may only send the logout request to identity providers which have sessions with the user. In particular, the multi-federation protocol manager may first query the session cache to determine which identity provider corresponds to a service provider with an open session with the user. Using the response from the query, the multi-federation protocol manager may send the logout request to only the identity providers that correspond to service providers having an open session with the user.

In step 239, each identity provider performs a single logout with their corresponding service providers. Specifically, each identity provider sends in their federation protocol, a single logout request to each service provider. In one or more embodiments of the invention, the identity providers send the logout request only to the service providers that have an open session with the user. Each service provider that receives the logout request performs a logout of the user and may respond with a status of the logout.

In step 241, the multi-federation protocol manager destroys user's sessions shared among all service providers. The multi-federation protocol manager may also remove information about the user's sessions from the session cache.

In step 243, the multi-federation protocol manager sends the status to the corresponding identity provider. The status may indicate whether the logout failed, succeeded, was a partial success (e.g., successful logout on some service providers), whether the logout was redirected, such as to another uniform resource location (URL) in the situation in which HTTP binding is used. In step 245, the corresponding identity provider sends the status to the service provider. The status may also be sent to the user agent by the service provider.

Figure 4:
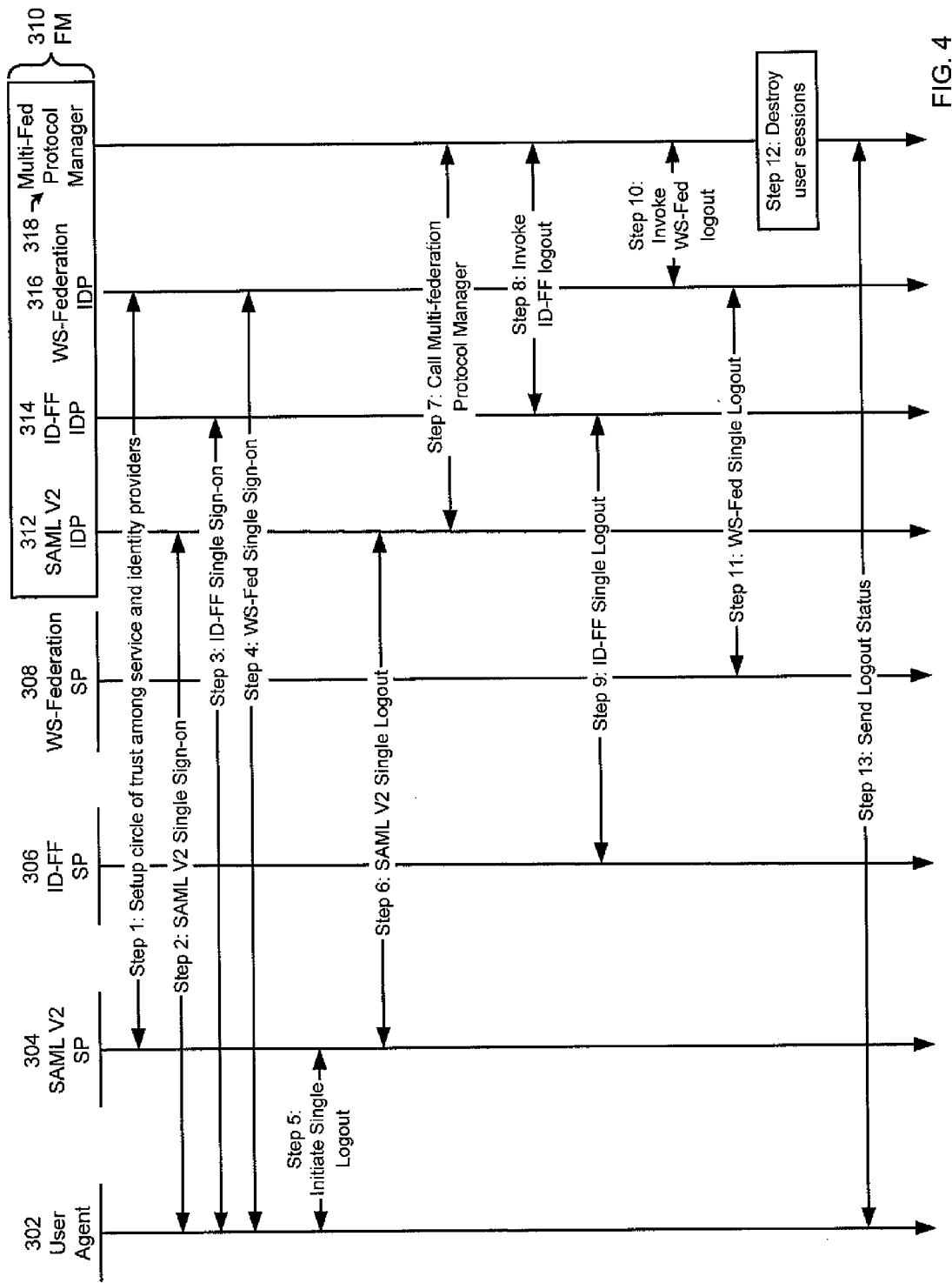
FIG. 4 shows an example in accordance with one or more embodiments of the invention.
Figure 5:
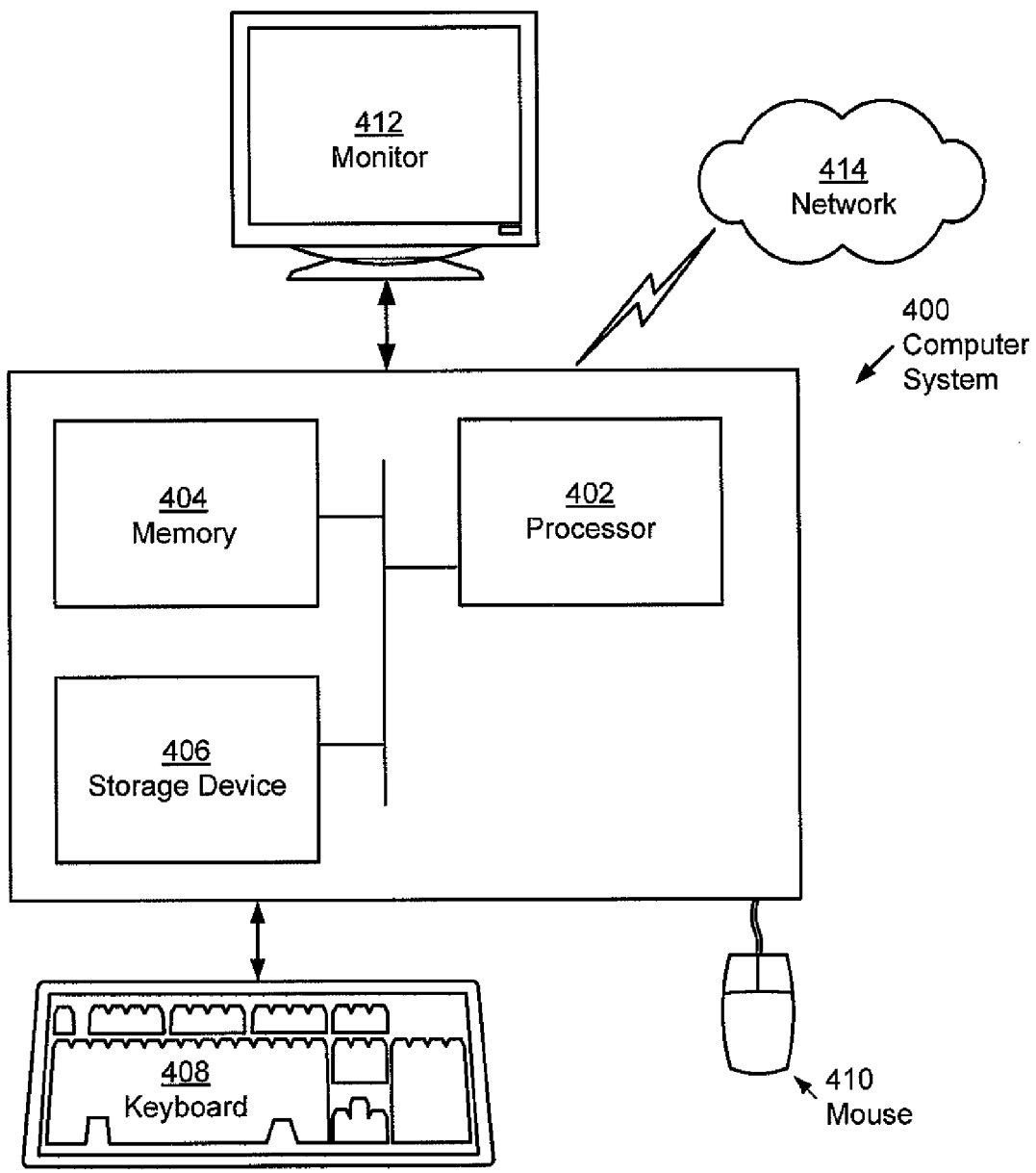
FIG. 5 shows a computer system in accordance with one or more embodiments of the invention.

FIG. 4 shows an example in accordance with one or more embodiments of the invention. The following example is for explanatory purposes only and not intended to limit the scope of the invention. The following example shows how a user may perform a single logout across multiple service providers in a circle of trust.

In step 1 of the example, the setup of the circle of trust is performed across all of the service providers and identity providers. Specifically, in the example, the service providers include a service provider that uses SAML V2 federation protocol ("SAML V2 SP") (304), a service provider that uses ID-FF federation protocol ("ID-FF SP") (306), and a service provider that uses WS-Federation protocol ("WS-Federation SP") (308).

In one or more embodiments of the invention, because the service providers include service providers that use SAML V2, ID-FF, and WS-Federation protocols, a federation manager ("FM") (310) is instantiated with an identity provider that uses SAML V2 federation protocol ("SAML V2 IDP") (312), an identity provider that uses ID-FF federation protocol ("ID-FF IDP") (314), and an identity provider that uses WS-Federation protocol ("WS-Federation IDP") (316).

Each identity provider (e.g., SAML V2 IDP (312), ID-FF IDP (314), WS-Federation IDP (316)) is added to the circle of trust. Further, metadata for each service provider (e.g., SAML V2 SP (304), ID-FF SP (306), WS-Federation SP (308)) is sent to the FM (310) to create a remote service provider instance for each service provider on the FM (310). The remote service provider instance is added to the circle of trust, thereby adding the service provider (e.g., SAML V2 SP (304), ID-FF SP (306), WS-Federation SP (308)) to the circle of trust. In addition to the remote service provider instances and the identity providers (e.g., SAML V2 IDP (312), ID-FF IDP (314), WS-Federation IDP (316)), the FM (310) also includes a multi-federation protocol manager ("Multi-Fed Protocol Manager") (318).

Continuing with the example, a single sign-on using the SAML V2 protocol is performed in step 2. Specifically, the user through the user agent (302) requests access to the SAML V2 SP (304). In response, the SAML V2 SP (304) determines that a session is not yet open for the user at the SAML V2 SP (304). Accordingly, the SAML V2 SP (304) sends a request to the SAML V2 IDP (312) using the SAML V2 federation protocol.

Because the request for access to the SAML V2 SP (304) is the first request, the SAML V2 IDP (312) determines that the user is not yet authenticated to any service provider in the circle of trust. In the example, the SAML V2 IDP (312) may perform the determination by querying the session cache. Because the user is not yet authenticated to any service providers in the circle of trust, the SAML V2 IDP (312) authenticates the user. For example, the SAML V2 IDP (312) may request the user to provide a username and password through the user agent (302). Once the user provides the username and password, the SAML V2 IDP (312) authenticates the user and sends an assertion to the SAML V2 SP (304). The SAML V2 SP (306) creates a session for the user and sends the session information to the FM (310) to add to the session cache.

Continuing with the example, a single sign-on using the ID-FF protocol is performed in step 3. Specifically, the user through the user agent (302) requests access to the ID-FF SP (306). In response, the ID-FF SP (306) determines that a session is not yet open for the user at the ID-FF SP (306). Accordingly, the ID-FF SP (304) sends a request to the ID-FF IDP (314) using the ID-FF federation protocol.

Because the user is already authenticated to the SAML V2 SP (304), the ID-FF IDP (314) determines that the user is authenticated to a service provider in the circle of trust. In the example, the ID-FF IDP (314) may perform the determination by querying the session cache. Accordingly, the ID-FF IDP (314) sends an assertion to the ID-FF SP (306). The ID-FF SP (306) creates a session for the user and sends the session information to the FM (310) to add to the session cache.

In step 4, a single sign-on using the WS-Federation protocol is performed. The single sign-on using the WS-Federation protocol may proceed using the WS-Federation SP (308) and the WS-Federation IDP (316) in a manner similar to the single sign-on using the ID-FF IDP protocol.

Continuing with the example, in step 5, the user initiates a single logout with the SAML V2 SP (304). In response, the SAML V2 SP (304) initiates a single logout using the SAML V2 protocol on the SAML V2 IDP (312) in step 6. The SAML V2 IDP determines that no other service providers exist that use the SAML V2 protocol. Thus, the SAML V2 IDP does not need to send a logout request to other service providers using the SAML V2 protocol.

In step 7, the SAML V2 IDP (312) calls the multi-fed protocol manager (318) to perform a single logout. In response, the multi-fed protocol manager (318) queries the session cache to determine that the user has three sessions open (i.e., the session with the SAML V2 SP (304), the session with the ID-FF SP (306), and the session with the WS-Federation SP (308)).

Accordingly, in step 8, the multi-fed protocol manager (318) uses the ID-FF SLO SPI to invoke an ID-FF logout on the ID-FF IDP (314). The ID-FF IDP (314) sends an ID-FF single logout request to the ID-FF SP (306) in step 9. Accordingly, the ID-FF SP (306) performs a single logout of the user and responds with the status that the logout is successful. On receiving the response, the ID-FF IDP (314) sends a message to the multi-fed protocol manager (318) indicating that the logout is successful.

In step 10, the multi-fed protocol manager (318) uses the WS-Federation SPI to invoke a WS-Federation logout on the WS-Federation IDP (316). The WS-Federation IDP (316) sends a WS-Federation single logout request to the WS-Federation SP (308) in step 11. Accordingly, the WS-Federation SP (308) performs a single logout of the user and responds with the status that the logout is successful. On receiving the response, the WS-Federation IDP (316) sends a message to the multi-fed protocol manager (318) indicating that the logout is successful.

In step 12, the multi-fed protocol manager (318) destroys the user sessions. In step 13, a logout status is sent. In particular, the multi-fed protocol manager may send a logout status to the SAML V2 IDP (312) indicating that the logout is successful. In response, the SAML V2 IDP (312) may send the logout status to the SAML V2 SP (304). Similarly, the SAML V2 SP (304) may send the logout status to the user agent (302). The user agent may display the status information for the user showing that the user is logged out.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., COT manager, multi-federation protocol manager, identity provider, etc.) may be located on a different node within the distributed system. In one embodiment of the invention, the node corresponds to a computer system. Alternatively, the node may correspond to a processor with associated physical memory. The node may alternatively correspond to a processor or a micro-core on a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a method and system for performing a single logout amongst multiple service providers that use heterogeneous federation protocols. In particular, embodiments of the invention are able to ensure that with a single logout request, a user is logged out of the circle of trust regardless of the heterogeneous federation protocols used in the circle of trust. Thus, embodiments of the invention allow for maintaining security in a system having applications that use different federation protocols.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for multi-protocol logout in a circle of trust, comprising:

receiving, by a first identity provider executing on at least one computer processor, a first logout request from a user agent to logout a user, wherein the first identity provider executes in a central federation manager, wherein the first identity provider manages communication with all service providers in the circle of trust that communicate using a first federation protocol;

initiating, by the first identity provider, a logout on any service provider associated with the first identity provider that has at least one open session with the user agent based on the first logout request;

sending, by the first identity provider to a multi-federation protocol manager, an access request to logout the user, wherein the multi-federation protocol manager executes in the central federation manager;

identifying, by the multi-federation protocol manager executing on the at least one computer processor, a second identity provider and a third identity provider associated with the user agent, wherein the second identity provider manages communication with all service providers in the circle of trust that communicate using a second federation protocol, wherein the third identity provider manages communication with all service providers in the circle of trust that communicate using a third federation protocol, and wherein the second identity provider and the third identity provider each execute in the central federation manager;
sending, by the multi-federation protocol manager, based on the access request, a second logout request to the second identity provider using the second federation protocol;
sending, by the second identity provider, a third logout request to each service provider corresponding to the second identity provider that has at least one open session with the user agent using the second federation protocol;
sending, by the multi-federation protocol manager, based on the access request, a fourth logout request to the third identity provider using the third federation protocol;
sending, by the third identity provider, a fifth logout request to each service provider corresponding to the third identity provider that has at least one open session with the user agent using the third federation protocol;
identifying a status of each logout of the user initiated in the circle of trust; and
sending, to the user agent, the status of each logout.

2. The method of claim 1, wherein the multi-federation protocol manager sends logout requests only to identity providers corresponding to service providers having at least one open session with the user agent.

3. The method of claim 1, further comprising:
accessing a session cache for the circle of trust to identify a plurality of open sessions;
identifying a service provider for each of the plurality of open sessions to obtain a plurality of identified service providers; and
identifying a federation protocol corresponding to each of the plurality of identified service providers to obtain a plurality of identified federation protocols,
wherein identifying the second identity provider and the third identity provider is performed according to the plurality of identified federation protocols.

4. The method of claim 1, further comprising:
identifying the second federation protocol that corresponds to the second identity provider; and
accessing a federation protocol single logout service provider interface to create the second logout request in the second federation protocol.

5. The method of claim 1, wherein identifying the status of each logout comprises:
receiving, by the first identity provider, the second identity provider, and the third identity provider, a service provider logout status from a plurality of service providers; and
responding, by the first identity provider, the second identity provider, and the third identity provider, to the multi-federation protocol manager with the service provider logout status.

6. The method of claim 1, wherein the first federation protocol, the second federation protocol, and the third federation protocol comprise at least two selected from a group consisting of Security Assertion Markup Language (SAML) protocol, SAML version 2 (SAML v2) protocol, Web Services Federation (WS-Federation) protocol, and Identity Federation Framework (ID-FF) protocol.

7. A system for multi-protocol logout in a circle of trust, comprising:
at least one computer processor;
a first identity provider in the circle of trust, executing on the at least one computer processor, and configured to:
receive a first logout request from a user agent to logout a user,
initiate a logout on any service provider associated with the first identity provider that has at least one open session with the user agent based on the first logout request, wherein the first identity provider manages communication with all service providers in the circle of trust that communicate using a first federation protocol; and
send, to a multi-federation protocol manager, an access request to logout the user;
the multi-federation protocol manager executing on the at least one computer processor and configured to:
identify a second identity provider and a third identity provider associated with the user agent,
send, based on the access request, a second logout request to the second identity provider using a second federation protocol; and
send, based on the access request, a third logout request to the third identity provider using a third federation protocol; and
send, to the user agent, a status of each logout of the user initiated in the circle of trust;
the second identity provider in the circle of trust, executing on the at least one computer processor, and configured to:
send, in response to the second logout request, a fourth logout request to each service provider corresponding to the second identity provider that has at least one open session with the user agent using the second federation protocol,
wherein the second identity provider manages communication with all service providers in the circle of trust that communicate using the second federation protocol; and
the third identity provider in the circle of trust, executing on the at least one computer processor, and configured to:
send, in response to the third logout request, a fifth logout request to each service provider corresponding to the third identity provider that has at least one open session with the user agent using the third federation protocol,
wherein the third identity provider manages communication with all service providers in the circle of trust that communicate using the third federation protocol.

8. The system of claim 7, wherein the multi-federation protocol manager is further configured to:
access a session cache for the circle of trust to identify a plurality of open sessions;
identify a service provider for each of the plurality of open sessions to obtain a plurality of identified service providers; and
identify a federation protocol corresponding to each of the plurality of identified service providers to obtain a plurality of identified federation protocols,
wherein the second identity provider and the third identity provider are identified according to the plurality of identified federation protocols.

9. The system of claim 7, wherein the multi-federation protocol manager is further configured to:
identify the second federation protocol that corresponds to the second identity provider; and access a federation protocol single logout service provider interface corresponding to the second federation protocol to create the second logout request in the second federation protocol.

10. The system of claim 7, wherein multi-federation protocol manager is further configured to identify the status of each logout of the user initiated in the circle of trust, wherein the status of each logout is obtained by:
receiving, by the second identity provider, a service provider logout status from a service provider; and
responding, by the second identity provider, to the multi-federation protocol manager with the service provider logout status.

11. The system of claim 7, wherein the first federation protocol, the second federation protocol, and the third federation protocol comprise at least two selected from a group consisting of Security Assertion Markup Language (SAML) protocol, SAML version 2 (SAML v2) protocol, Web Services Federation (WS-Federation) protocol, and Identity Federation Framework (ID-FF) protocol.

12. A non-transitory computer readable medium comprising computer readable program code embodied therein for causing a computer system to:
receive, by a first identity provider, a first logout request from a user agent to logout a user, wherein the first identity provider executes in a central federation manager, wherein the first identity provider manages communication with all service providers in a circle of trust that communicate using a first federation protocol;
initiate, by the first identity provider, a logout on any service provider associated with the first identity provider that has at least one open session with the user agent based on the first logout request;
sending, by the first identity provider to a multi-federation protocol manager, an access request to logout the user, wherein the multi-federation protocol manager executes in the central federation manager;
identify, by the multi-federation protocol manager, a second identity provider and a third identity provider associated with the user agent, wherein the second identity provider manages communication with all service providers in the circle of trust that communicate using a second federation protocol, wherein the third identity provider manages communication with all service providers in the circle of trust that communicate using a third federation protocol, and wherein the second identity provider and the third identity provider each execute in the central federation manager;
send, by the multi-federation protocol manager, based on the access request, a second logout request to the second identity provider based on the access request using the second federation protocol;
send, by the second identity provider, a third logout request to each service provider corresponding to the second identity provider that has at least one open session with the user agent using the second federation protocol;
send, by the multi-federation protocol manager, based on the access request, a fourth logout request to the third identity provider using the third federation protocol;
send, by the third identity provider, a fifth logout request to each service provider corresponding to the third identity provider that has at least one open session with the user agent using the third federation protocol;
identify a status of each logout of the user initiated in the circle of trust; and
send, to the user agent, the status of each logout.

13. The non-transitory computer readable medium of claim 12, wherein the multi-federation protocol manager sends logout requests only to identity providers corresponding to service providers having at least one open session with the user agent.

14. The non-transitory computer readable medium of claim 12, wherein the computer readable program code further causes the computer system to:
access a session cache for the circle of trust to identify a plurality of open sessions;
identify a service provider for each of the plurality of open sessions to obtain a plurality of identified service providers; and
identify a federation protocol corresponding to each of the plurality of identified service providers to obtain a plurality of identified federation protocols,
wherein identifying the second identity provider and the third identity provider is performed according to the plurality of identified federation protocols.

15. The non-transitory computer readable medium of claim 12, wherein the computer readable program code further causes the computer system to:
identifying the second federation protocol that corresponds to the second identity provider; and
accessing a federation protocol single logout service provider interface to create the second logout request in the second federation protocol.

16. The computer readable medium of claim 12, wherein identifying the status of each logout comprises:
receiving, by the first identity provider, the second identity provider, and the third identity provider, a service provider logout status from a plurality of service providers; and
responding, by the first identity provider, the second identity provider, and the third identity provider, to the multi-federation protocol manager with the service provider logout status.

17. The computer readable medium of claim 12, wherein the first federation protocol, the second federation protocol and the third federation protocol comprise at least two selected from a group consisting of Security Assertion Markup Language (SAML) protocol, SAML version 2 (SAML v2) protocol, Web Services Federation (WS-Federation) protocol, and Identity Federation Framework (ID-FF) protocol.

18. The method of claim 1, further comprising:
receiving, by the first identity provider, a first request using the first federation protocol to authenticate the user for a first service provider;
authenticating, by the first identity provider, the user to the circle of trust in response to the first request;
sending, by the first identity provider, to the first service provider, a first assertion using the first federation protocol to authenticate the user to the first service provider in response to authenticating the user to the circle of trust, wherein the first service provider communicates using the first federation protocol;
receiving, by the second identity provider, a second request using the second federation protocol to authenticate the user for a second service provider;
determining, by the second identity provider, that the user is not authenticated to any service provider corresponding to the second identity provider;
sending, by the second identity provider to the multi-federation protocol manager, a third request to determine whether the user is authenticated to any identity provider in response to determining that the user is not authenticated to any service provider corresponding to the second identity provider;

determining, by the multi-federation protocol manager, that the user is authenticated to the first identity provider in response to the third request;

sending, by the multi-federation protocol manager, a response to the second identity provider that the user is authenticated using the second federation protocol;

sending, by the second identity provider, to the second service provider, a second assertion using the second federation protocol to authenticate the user to the second service provider;

receiving, by the second identity provider, a fourth request using the second federation protocol to authenticate the user for a third service provider;

determining, by the second identity provider, that the user is authenticated to the second service provider corresponding to the second identity provider; and sending, by the second identity provider, to the second service provider, a third assertion using the second federation protocol to authenticate the user to the third service provider in response to determining that the user is authenticated to the second service provider.

19. The system of claim 7, wherein:

the first identity provider is further configured to:
  receive a first request using the first federation protocol to authenticate the user for a first service provider,
  authenticate the user to the circle of trust in response to the first request; and
  send to the first service provider, a first assertion using the first federation protocol to authenticate the user to the first service provider in response to authenticating the user to the circle of trust, wherein the first service provider communicates using the first federation protocol;

the second identity provider is further configured to:
  receive a second request using the second federation protocol to authenticate the user for a second service provider;
  determine that the user is not authenticated to any service provider corresponding to the second identity provider;
  send, to the multi-federation protocol manager, a third request to determine whether the user is authenticated to any identity provider in response to determining that the user is not authenticated to any service provider corresponding to the second identity provider;
  send, to the second service provider, a second assertion using the second federation protocol to authenticate the user to the second service provider based on a response from the multi-federation protocol manager;
  receive, by the second identity provider, a fourth request using the second federation protocol to authenticate the user for a third service provider;
  determine that the user is authenticated to the second service provider corresponding to the second identity provider; and
  send to the second service provider, a third assertion using the second federation protocol to authenticate the user to the third service provider in response to determining that the user is authenticated to the second service provider; and the multi-federation protocol manager is further configured to:
  determine that the user is authenticated to the first identity provider in response to the third request; and
  send the response to the second identity provider that the user is authenticated using the second federation protocol.

20. The non-transitory computer readable medium of claim 12, wherein the computer readable program code further causes the computer system to:

receive, by the first identity provider, a first request using the first federation protocol to authenticate the user for a first service provider, authenticate, by the first identity provider, the user to the circle of trust in response to the first request;

send, by the first identity provider, to the first service provider, a first assertion using the first federation protocol to authenticate the user to the first service provider in response to authenticating the user to the circle of trust, wherein the first service provider communicates using the first federation protocol;

receive, by the second identity provider, a second request using the second federation protocol to authenticate the user for a second service provider;

determine, by the second identity provider, that the user is not authenticated to any service provider corresponding to the second identity provider;

send, by the second identity provider to the multi-federation protocol manager, a third request to determine whether the user is authenticated to any identity provider in response to determining that the user is not authenticated to any service provider corresponding to the second identity provider;

determine, by the multi-federation protocol manager, that the user is authenticated to the first identity provider in response to the third request;

send, by the multi-federation protocol manager, a response to the second identity provider that the user is authenticated using the second federation protocol;

send, by the second identity provider, to the second service provider, a second assertion using the second federation protocol to authenticate the user to the second service provider;

receive, by the second identity provider, a fourth request using the second federation protocol to authenticate the user for a third service provider;

determine, by the second identity provider, that the user is authenticated to the second service provider corresponding to the second identity provider; and send, by the second identity provider, to the second service provider, a third assertion using the second federation protocol to authenticate the user to the third service provider in response to determining that the user is authenticated to the second service provider.

* * * * *